US009113306B2

(12) United States Patent
Jackson et al.

(10) Patent No.: US 9,113,306 B2
(45) Date of Patent: Aug. 18, 2015

(54) PREDICTIVE ASSISTANCE INFORMATION (71) Applicant: Google Inc., Mountain View, CA (US)

(72) Inventors: Dean Kenneth Jackson, Pittsburgh, PA (US); Daniel Victor Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/053,435

(22) Filed: Oct. 14, 2013

(65) Prior Publication Data
US 2015/0038173 A1 Feb. 5, 2015

Related U.S. Application Data (60) Provisional application No. 61/861,664, filed on Aug. 2, 2013.

(51) Int. Cl.
*H04W 24/00* (2009.01)
*H04W 4/02* (2009.01)
*H04W 4/04* (2009.01)

(52) U.S. Cl.
CPC ............. *H04W 4/025* (2013.01); *H04W 4/027* (2013.01); *H04W 4/028* (2013.01); *H04W 4/046* (2013.01); *H04W 4/022* (2013.01)

(58) Field of Classification Search
CPC ....... H04W 64/00; H04W 4/02; H04W 4/022; H04W 4/025; H04W 4/027; H04W 4/028; H04W 4/046

USPC ................. 455/456.1, 456.3, 456.5–457, 421
See application file for complete search history.

(56) References Cited

U.S. PATENT DOCUMENTS

| 2005/0227696 | A1 | 10/2005 | Kaplan et al. |
| 2012/0100867 | A1 | 4/2012 | Liang et al. |
| 2013/0084882 | A1* | 4/2013 | Khorashadi et al. ....... 455/456.1 |
| 2013/0137463 | A1 | 5/2013 | Busch |

OTHER PUBLICATIONS

International Search Report and Written Opinion of international application PCT/US2014/049452, dated Oct. 22, 2014, 10 pgs.

* cited by examiner

*Primary Examiner* — Babar Sarwar
(74) *Attorney, Agent, or Firm* — Shumaker & Sieffert, P.A.

(57) ABSTRACT

A computing device described may determine a current speed of the computing device, and, responsive to determining that the current speed of the computing device satisfies a threshold speed, determine whether a current geographic location of the computing device is within with an uncommon stopping area, the uncommon stopping area being a geographic area in which less than a threshold number of other computing devices have been determined to have previously stopped. The computing device may also, responsive to determining that the current geographic location of the computing device is within the uncommon stopping area and responsive to determining that assistance-type information is relevant to the user of the computing device, determine, based on the current geographic location, assistance information relevant to the current geographic location, and output, for display, the assistance information.

18 Claims, 5 Drawing Sheets

PREDICTIVE ASSISTANCE INFORMATION

This application claims the benefit of U.S. Provisional Application No. 61/861,664, filed Aug. 2, 2013, the entire content of which is incorporated by reference herein.

BACKGROUND

A mobile computing device (e.g., a mobile phone, tablet computer, etc.) may function as, among other things, a personal digital assistant (PDA), an Internet browser, a clock, and a navigation device. With such mobile computing devices, a user has access to seemingly unlimited amounts of information at almost any time and from almost any location. Mobile computing devices may be used by the user to keep track of time, to navigate, and/or to otherwise search for information to make traveling in and out of a geographical area easier.

While having access to large amounts of information may be beneficial to a user while traveling, a mobile computing device may not always present accessed information in an organized way. For example, when a user travels by automobile or other vehicle, the vehicle may break down and need repair. In order to identify an auto repair shop, a tow truck or other assistance information, the mobile computing device may be configured such that a user is required to perform multiple, interrelated searches with various applications executing on the mobile computing device and, thereafter, manually piece the results of the searches together to find the desired assistance information.

SUMMARY

In one example, the disclosure is directed to a method that includes determining, by a computing device, a current speed of the computing device, and, responsive to determining that the current speed of the computing device satisfies a threshold speed, determining whether the computing device is currently located within with an uncommon stopping area, the uncommon stopping area being a geographic area in which less than a threshold number of other computing devices have been determined to have previously stopped. The method may also include, responsive to determining that the computing device is currently located within the uncommon stopping area, determining whether assistance-type information is relevant to a user of the computing device. The method may also include, responsive to determining that the assistance-type information is relevant to the user, determining, based on a current geographic location of the computing device, assistance information relevant to the current geographic location, and outputting, by the computing device and for display, the assistance information.

In one example, the disclosure is directed to a computing device that includes one or more processors and at least one module. The at least one module is operable by the one or more processors to determine a current speed of the computing device, responsive to determining that the current speed of the computing device satisfies a threshold speed, send an indication of a current geographic location of the computing device to a remote computing system, receive, from the remote computing system, an indication of whether the current geographic location of the computing device is within an uncommon stopping area, the uncommon stopping area being a geographic area in which less than a threshold number of other computing devices have been determined to have previously stopped, and determine, based on the received indication, whether the current geographic location of the computing device is within the uncommon stopping area. The at least one module is further operable by the one or more processors to responsive to determining that the current geographic location of the computing device is within the uncommon stopping area, determine whether assistance-type information is relevant to a user of the computing device, and responsive to determining that assistance-type information is relevant to the user of the computing device, determine, based on the current geographic location, assistance information relevant to the current geographic location, and output, for display, the assistance information.

In one example, the disclosure is directed to a method that includes receiving, by a computing system, from a mobile computing device, an indication of a current speed of the mobile computing device and a geographic location of the mobile computing device, and responsive to determining that the current speed of the mobile computing device satisfies a threshold speed and that the geographic location of the mobile computing device is within an uncommon stopping area, determining, by the computing system, one or more businesses located within a threshold distance from the geographic location of the mobile computing device, the one or more businesses being categorized as providing assistance services. The method may also include, retrieving, by the computing system, information about the one or more determined businesses as assistance information, and sending, by the computing system, to the mobile computing device, the assistance information.

The details of one or more examples are set forth in the accompanying drawings and the description below. Other features, objects, and advantages of the disclosure will be apparent from the description and drawings, and from the claims.

DETAILED DESCRIPTION

In general, techniques of this disclosure may enable a computing system to predictively determine that a user of a mobile computing device may require assistance and, in response, automatically provide assistance information to the user. For example, the computing system may be configured to determine, based at least in part on a current location and a current speed of a computing device, that the computing device has stopped moving while located within an area typically not associated with stopping. Based on this determination, the computing system may determine that the user of the computing device likely requires assistance and may identify potentially relevant assistance information (e.g., based on the current location of the computing device). The assistance information may include information about service providers that are likely to offer assistance services (e.g., auto towing services, medical services, etc.) and that are located within a threshold distance from the current location of the computing device. The computing system may provide the assistance information to the computing device that, in turn, may output the assistance information for display in a graphical user interface. Moreover, the computing system may perform these operations automatically without, for example, requiring such operations be initiated by the user. In this manner, a computing system configured in accordance with the techniques of this disclosure may predict when a user of a computing device is likely to want assistance information and proactively provide the assistance information to the computing device associated with the user, thereby reducing the amount of user input, effort, and time required to obtain the assistance information.

While the computing system may proactively provide the assistance information, the computing system may receive the current location information and current speed information only if the computing system receives prior permission from a user to collect and analyze the information. For example, in situations discussed below in which the computing device may collect or may make use of personal information about the user, the user may be provided with an opportunity to control whether programs or features of the computing system can collect user information (e.g., information about a user's e-mail, a user's social network, social actions or activities, profession, a user's preferences, or a user's current location), or to control whether and/or how to the computing device may receive content that may be relevant to the user. In addition, certain data may be treated in one or more ways before it is stored or used by the computing device, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Figure 1:
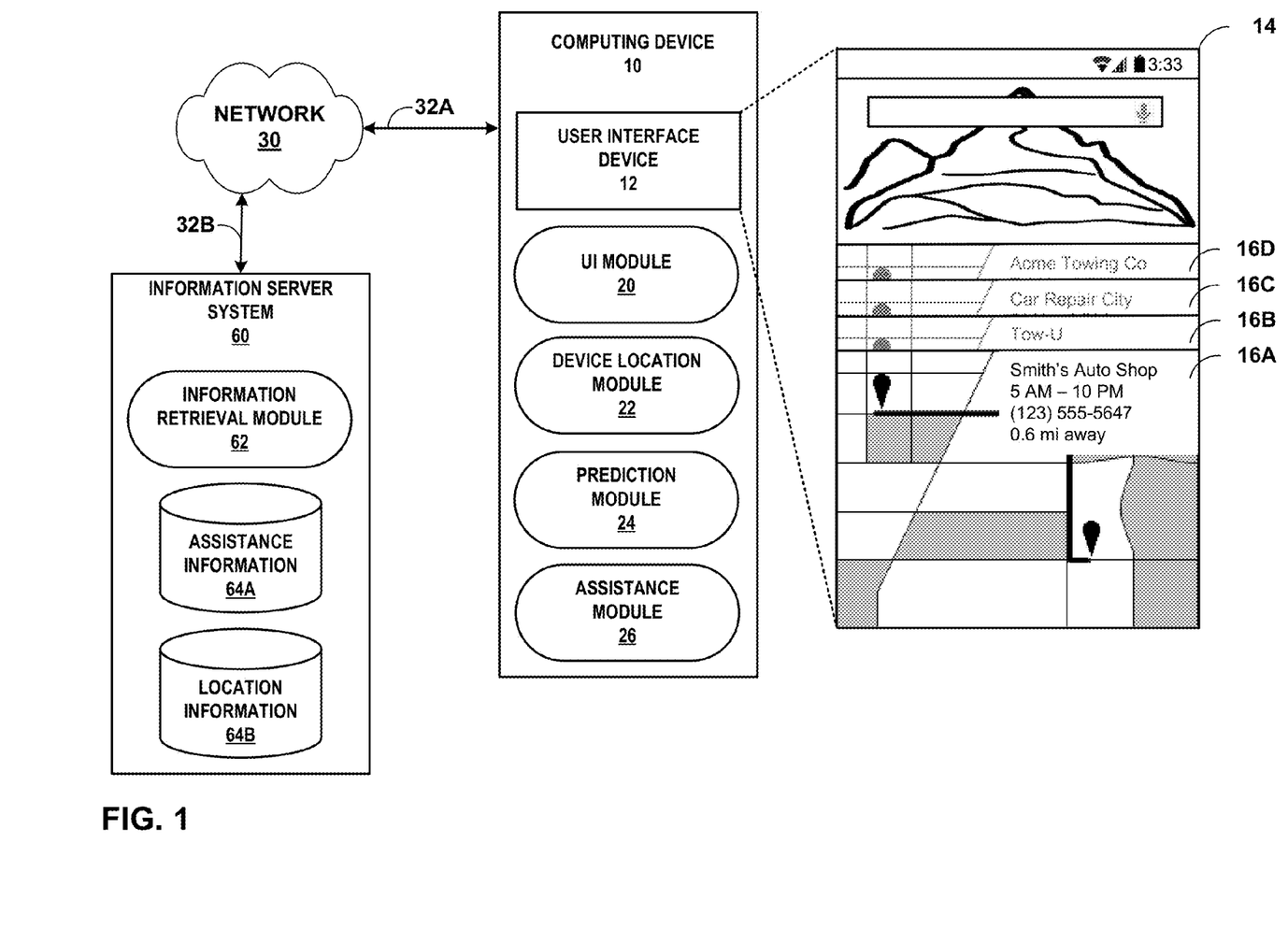
FIG. 1 is a conceptual diagram illustrating an example computing system configured to predictively present assistance information, in accordance with one or more aspects of the present disclosure.

FIG. 1 is a conceptual diagram illustrating an example computing system configured to predictively present assistance information, in accordance with one or more aspects of the present disclosure. In the example of FIG. 1, the computing system includes computing device 10, information server system 60, and network 30.

Network 30 represents any public or private communication network, for instance, a cellular, Wi-Fi, and/or other type of network for transmitting data between computing devices. Computing device 10 and information server system 60 may send and receive data across network 30 using any suitable communication techniques. For example, computing device 10 may be operatively coupled to network 66 using network link 32A. Information server system 60 may be operatively coupled to network 30 by network link 32B. Network 30 may include network hubs, network switches, network routers, etc., that are operatively inter-coupled thereby providing for the exchange of information between computing device 10 and information server system 60. In some examples, network links 32A and 32B may be Ethernet, ATM or other network connections. Such connections may be wireless and/or wired connections.

Information server system 60 represents any suitable remote computing system, such as one or more desktop computers, laptop computers, mainframes, servers, cloud computing systems, etc. capable of sending and receiving information across network link 32B to network 30. In some examples, information server system 60 represents a cloud computing system that provides one or more services through network 30. One or more computing devices, such as computing device 10, may access the one or more services provided by the cloud using information server system 30. For example, computing device 10 may store and/or access data in the cloud using information server system 60.

Information server system 60 includes information retrieval module 62, assistance information data store 64A and location information data store 64B. Information retrieval module 62 may perform operations described using software, hardware, firmware, or a mixture of hardware, software, and firmware residing in and/or executing at Information server system 60. Information server system 60 may execute information retrieval module 62 with multiple processors or multiple devices. Information server system 60 may execute information retrieval module 62 as a virtual machine executing on underlying hardware. Information retrieval module 62 may execute as a service of an operating system or computing platform. Information retrieval module 62 may execute as one or more executable programs at an application layer of a computing platform.

Data stores 64A and 64B represent any suitable storage medium for storing data related to communications and navigation. For example, assistance information data store 64A may store information about one or more businesses determined to provide one or more assistance services. For example, a business may provide auto repair and/or towing services. As another example, a business may provide legal services (e.g., for defending a traffic ticket or raising bail). In general, the term "assistance service" refers to any service provided by a business, which helps a person with a particular task, such as by providing money, resources, or information to help the person. The assistance information may be organized within data store 64A according to business names, addresses, service categories, etc. Information server system 60 may access the data within data store 64A, for instance, by looking up a geographical location and obtaining information about one or more business associated with the geographical location. Data store 64B may store location information such as, digital maps, navigation durations, navigation directions, and the like. Information server system 60 may provide access to the data stored at data stores 64A and 64B as a cloud based data access service to devices connected to network 30, such as computing device 10.

Information retrieval module 62 may perform functions for responding to information requests from computing device 10 related to the data stored in data stores 64A and 64B and other data stored remote to information server system 60 (e.g., data on the Internet). For instance, information retrieval module 62 may receive a request from computing device 10 via network link 32B for an estimated duration of time to walk from one geographical location to another. Information retrieval module 62 may access data within data store 64B and/or data on the Internet or otherwise stored remotely to information server system 60 to provide information in response to the request by sending the information to computing device 10, via network link 32B and through network 30.

In the example of FIG. 1, computing device 10 is a mobile computing device. However, in other examples, computing device 10 may be a tablet computer, a personal digital assistant (PDA), a laptop computer, a portable gaming device, a portable media player, an e-book reader, a watch, television platform, automobile navigation system, wearable computing platform, or other type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14), which may be associated with functionality provided by computing device 10. For example, UID 12 may present various user interfaces of applications executing at or accessible by computing device 10 (e.g., an electronic message application, a navigation application, an Internet browser application, etc.). A user may interact with a respective user interface of an application to cause computing device 10 to perform operations relating to a function.

Computing device 10 may include user interface ("UI") module 20, device location module 22, prediction module 24, and assistance module 26. Modules 20, 22, 24, and 26 may perform operations described using software, hardware, firmware, or a mixture of hardware, software, and firmware residing in and/or executing at computing device 10. Computing device 10 may execute modules 20, 22, 24, and 26 with one or more processors. Computing device 10 may execute modules 20, 22, 24, and 26 as a virtual machine executing on underlying hardware. Modules 20, 22, 24, and 26 may execute as a service of an operating system or computing platform. Modules 20, 22, 24, and 26 may execute as one or more executable programs at an application layer of a computing platform.

UI module 20 may cause UID 12 to present user interface 14. User interface 14 includes graphical indications (e.g., elements) displayed at various locations of UID 12. FIG. 1 illustrates information cards 16A-D (collectively, "cards 16") as one example graphical indication within user interface 14. As described in more detail below, cards 16 may include information related to assistance information identified based on a context (e.g., time and location data) of computing device 10. UI module 20 may receive the information from assistance module 26, for instance, in response to computing device 10 determining that assistance-type information is relevant to the user (e.g., because the computing device has stopped within an uncommon stopping area). UI module 20 may update user interface 14 with cards 16 to include information and may cause UID 12 to output, for display, cards 16 within user interface 14.

Device location module 22 may determine a current location of computing device 10 and a current time. For example, computing device 10 may include a global positioning system (GPS) radio for receiving GPS signals (e.g., from a GPS satellite) having data corresponding to the current time and the current location of computing device 10. Device location module 22 may analyze the GPS signals received by the GPS radio and determine the current location of computing device 10 and the current time. Computing device 10 may include other radios or sensor devices (e.g., cellular radio, Wi-Fi radio, etc.) capable of receiving signal data, which device location module 22 can use to determine the current location of computing device 10 and the current time.

In some examples, device location module 22 may determine a relative location and/or perform location multilateration to determine a current location (e.g., a technique for determining a single location based on relative position data received from two or more signals). In some examples, device location module 22 may determine location data as coordinate (e.g., GPS) location data. In other examples, device location module 22 may determine location data as one or more general or relative locations, such as an address, a place, a country, a city, a type of building (e.g., a library, an airport, etc.), a business, etc.

In some examples, device location module 22 may obtain the current location of computing device 10 and/or the current time from information server system 60 via network 30. In response to a Wi-Fi network identifier received from device location module 22, information server system 60 may send location information of computing device 10 to device location module 22. Device location module 22 may output location and time data to other modules of computing device 10, such as prediction module 24.

As used throughout this disclosure, the phrase "current location" refers to a location at a particular time. In various instances, computing device 10 may have physically moved to a different geographic location between the time at which the current location was first determined and the present moment. Even so, the "current location" of computing device 10 is determined to be the location at which the device was physically located at the moment that the location was last determined. The same "current location" may be used throughout the prediction process even though updated current locations may be determined during the prediction process. In general, a "current location" of computing device 10 may be any location within a threshold distance (e.g., 1 meter, 5 meters, 10 meters, 100 meters, 500 meters, etc.) surrounding the determined current location. Similarly, the phrase "current time" refers to a particular time at which computing device 10 determined the "current time" and may be the same time used throughout the prediction process even though the literal current time may change by fractions of a second, a second, or some other amount during the prediction process.

Device location module 22 may also determine a current speed of computing device 10. In determining the current speed, device location module 22 may utilize GPS data and/or a series of geographic locations and corresponding times. Based on the locations and times, device location module 22 may determine a distance travel during a particular duration of time, thereby determining an average speed of computing device 10 during the particular duration of time. In some examples, device location module 22 may compare the determined speed of computing device 10 to a threshold speed. If device location module 22 determines that the determined speed satisfies the threshold speed, device location module 22 may provide current location and current time information to prediction module 24. For example, if device location module 22 determines that computing device 10 is moving below a minimum threshold speed (e.g., 1 kilometer per hour (kph), 3 miles per hour (mph), 5 mph, 10 kph, 15 mph, 30 kph, etc.), device location module 22 may determine that computing device 10 is no longer moving. Responsive to determining that computing device 10 is no longer moving, device location module 22 may automatically provide the current time and current location information to prediction module 24. If device location module 22 determines that computing device 10 is traveling a speed greater than the threshold speed, device location module 22 may refrain from providing the current location, current time, and current speed information to prediction module 24.

While the computing system may proactively provide the assistance information, the computing system may receive the current location information and current speed information only if the computing system receives permission from a user to analyze the information. For example, in situations discussed herein in which the computing device may collect or may make use of personal information about the user, the user may be provided with an opportunity to control whether programs or features of the computing system can collect user information (e.g., information about a user's e-mail, a user's social network, social actions or activities, profession, a user's preferences, or a user's current location), or to control whether and/or how to the computing device may receive content that may be relevant to the user. In addition, certain data may be treated in one or more ways before it is stored or used by the computing device, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Prediction module 24 may receive the current location and current time information from device location module 22 and, based on the received information, predict whether assistance-type information is relevant to a user of computing device 10. For example, prediction module 24 may determine that the location information indicates that a current location of computing device 10 corresponds to a highway, freeway, or other roadway and that computing device 10 is stopped in a location that is not a common place to stop (i.e., an uncommon "stopping area"). Uncommon stopping areas may include freeways, highways, portions of roadways not associated with parking, traffic control mechanisms (e.g., stoplights, stop signs, etc.). In some examples, prediction module 24 may determine that a particular stopping area is a common stopping area at a certain time of day (e.g., a freeway during the evening rush hour) and that the same stopping area is an uncommon stopping area at a different time of day (e.g., the same freeway at 2 AM). Further, prediction module 24 may receive (e.g., from information server system 60) average speed information for other computing devices within a threshold distance of computing device 10 (e.g., within a location otherwise determined to be an uncommon stopping area). If the average speed information for the other computing devices indicates that computing device 10 is one of several computing devices that are stopped or moving slowing in the same area, prediction module 24 may determine that computing device 10 is in a traffic jam or is otherwise not stopping in an uncommon stopping area.

In various instances, prediction module 24 may determine that the location of computing device 10 corresponds to a controlled intersection of roadways (e.g., a stoplight, a stop sign, etc.). In these instances, prediction module 24 may determine that the location at which computing device stopped corresponds to a common stopping area (e.g., because other computing device stop at or near the same location). Responsive to determining that computing device 10 stopped at a common stopping area, prediction module 24 may determine that assistance-type information may not be relevant to a user of computing device 10 and may refrain from causing assistance module 26 to retrieve the assistance information.

In some examples, to predict whether assistance-type information is relevant to the user of computing device 10, prediction module 24 may cause computing device 10 to output information, including location information, to information server system 60. Based on the outputted information, information server system 60 may send, to computing device 10, an indication of whether assistance-type information is relevant to the user of computing device 10. Prediction module 24 may determine whether assistance-type information is relevant to the user of computing device 10 based on the indication received from information service system 60.

In instances where information server system 60 and/or computing device 10 determine that assistance-type information is relevant to a user of computing device 10, computing device 10 may obtain assistance information. In one example, assistance module 26 of computing device 10 may identify the assistance information based on a current location of computing device 10 and retrieve the identified assistance information from a local or remote data store accessible by computing device 10. In another example, assistance module 26 may request the assistance information from information server system 60.

Information server system 60 may receive the request for assistance from computing device 10. The request may include an indication of the current location of computing device 10. In some examples the request for assistance information may include a type of assistance information being requested, a location and speed history of computing device 10, and/or a mode of transportation determined to be the particular mode of transportation being used by the user. Information retrieval module may retrieve assistance information from assistance information 64A by, for example, executing a query that includes one or more parameters specifying information included in the request for assistance information.

For each query result (e.g., each assistance service provider having information stored within assistance information 64A and that satisfies a set of query parameters), information retrieval module 62 may query location information 64B to determine navigational directions from the current location of computing device 10 to a location associated with each respective query result. As one example, information server system 60 may determine that "Smith's Auto Shop," shown in card 16A, is a query result that satisfies the query parameters and that "Smith's Auto Shop" is 0.6 miles from the current location of computing device 10. Information server system 60 may output an indication of the query result and the navigational information to computing device 10 via network 30. Prediction module 24 of computing device 10 may receive the indication and cause UI module 20 to generate a graphical user interface element (e.g., card 16A) for display by user interface device 12.

In some examples, information retrieval module 62 may filter results based on a current time (e.g., as provided by computing device 10, as determined by information server system 60, etc.). In these examples, information retrieval module 62 may exclude results for assistance service providers that are not open or otherwise not providing assistance services at the current time. For example, if the current time is 2 AM, information retrieval module 62 may exclude Smith's Auto Shop from the query results and, instead, provide information about a different assistance service provider that is currently open (e.g., Tow-U, shown in card 16B, or Car Repair City, shown in card 16C).

Computing device 10 receives the assistance information (i.e., the query results) from information server system 60 and stores the assistance information. In some examples, computing device 10 may be configured to automatically output an indication of the assistance information (e.g., a notification indicating that assistance information is available, a notification indicating at least a portion of the assistance information, etc.). In other examples, computing device 10 may be configured to output at least an indication of the assistance information in response to detecting user input. For example, a user may perform a gesture, detected by UI device 12, which is indicative of requesting presentation of a predicted information graphical user interface (e.g., GUI 14). If a user of computing device 10 does not want to see the assistance information (e.g., because the user is not in need of the assistance information), the user may perform a gesture to dismiss the assistance information and computing device 10 will cease outputting the assistance information within GUI 14. In some examples, computing device 10 may be configured to change when computing device 10 determines that assistance-type information is relevant a user based on the user dismissing displayed assistance information. In this way, techniques of this disclosure may enable a computing device to automatically determine when assistance-type information is relevant to a user and automatically retrieve the assistance information without requiring the user to specifically search for the assistance information.

While the example shown in FIG. 1 illustrated prediction module 24 and assistance module 26 as being including within computing device 10, prediction module 24 and assistance module 26 may be included within information server system 60. In some examples the functionality provided by prediction module 24 and assistance module 26 may be wholly performed by computing device 10, wholly performed by information server system 60, or divided, in any manner, between computing device 10 and information server system 60. As one example, computing device 10 may provide location information to information server system 60. Based on the location information, information server 60 may determine whether the speed of computing device 10 drops below a threshold speed, may determine whether the current location of computing device 10 is associated with an uncommon stopping location, and may provide relevant assistance information to computing device 10.

Figure 2:
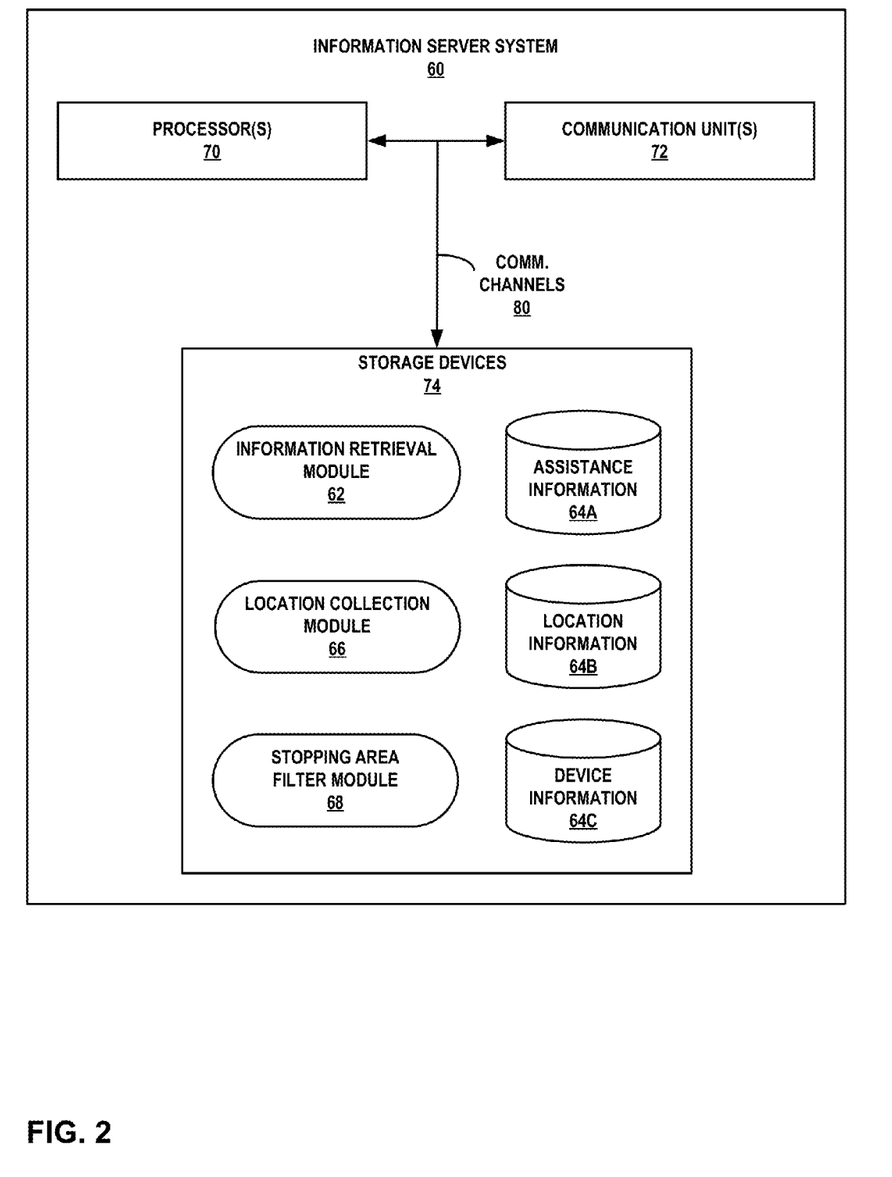
FIG. 2 is a block diagram illustrating an example computing system configured to predict when assistance information may be of interest to a user, in accordance with one or more aspects of the present disclosure.

FIG. 2 is a block diagram illustrating an example computing system configured to predict when assistance information may be relevant to a user, in accordance with one or more aspects of the present disclosure. Information server system 60 of FIG. 2 is described below within the context of FIG. 1. FIG. 2 illustrates only one particular example of computing device 10, and many other examples of information server system 60 may be used in other instances and may include a subset of the components included in example information server system 60 or may include additional components not shown in FIG. 2.

As shown in the example of FIG. 2, information server system 60 includes one or more processors 70, one or more communication units 72, and one or more storage devices 74. Storage devices 74 of information server system 60 also include information retrieval module 62, location collection module 66, assistance information 64A and location information 64B. Communication channels 80 may interconnect each of the components 70, 72, and 74 for inter-component communications (physically, communicatively, and/or operatively). In some examples, communication channels 80 may include a system bus, a network connection, an inter-process communication data structure, or any other method for communicating data.

One or more communication units 72 of information server system 60 may communicate with external devices via one or more networks by transmitting and/or receiving network signals on the one or more networks. For example, information server system 60 may use communication unit 72 to transmit and/or receive radio signals on a radio network such as a cellular radio network. Examples of communication unit 72 include a network interface card (e.g. such as an Ethernet card), an optical transceiver, a radio frequency transceiver, a GPS receiver, or any other type of device that can send and/or receive information. Other examples of communication units 72 may include short wave radios, cellular data radios, wireless Ethernet network radios, as well as universal serial bus (USB) controllers.

One or more storage devices 74 within information server system 60 may store information for processing during operation of information server system 60 (e.g., information server system 60 may store data accessed by modules 62 and 66 during execution at information server system 60). In some examples, storage devices 74 are a temporary memory, meaning that a primary purpose of storage devices 74 is not long-term storage. Storage devices 74 on information server system 60 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 74, in some examples, also include one or more computer-readable storage media. Storage devices 74 may be configured to store larger amounts of information than volatile memory. Storage devices 74 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 74 may store program instructions and/or data associated with modules 62 and 66.

One or more processors 70 may implement functionality and/or execute instructions within information server system 60. For example, processors 70 on information server system 60 may receive and execute instructions stored by storage devices 74 that execute the functionality of information retrieval module 62, location collection module 66, and stopping area filter module 68. These instructions executed by processors 70 may cause information server system 60 to store information, within storage devices 74 during program execution. Processors 70 may execute instructions of modules 62, 66, and 68 to provide assistance information to one or more computing devices (e.g., computing device 10 of FIG.

1). That is, modules 62, 66, and 68 may be operable by processors 70 to perform various actions or functions of information server system 60.

Information server system 60 may provide access to the data stored at data stores 64A, 64B, and 64C as a cloud based data access service to devices connected to network 30 (shown in FIG. 1), such as computing device 10. In some examples, location collection module 66 may collect (i.e., receive) any combination of location, speed, and time information from a number of different computing devices over a period of time, but only if information server system 60 receives permission from the various users of the computing devices to receive and analyze the information. For example, in situations discussed herein in which information server system 60 may collect or may make use of personal information about any user, the user may be provided with an opportunity to control whether programs or features of the computing system can collect user information (e.g., a user's current location, a user's current speed, etc.), or to control whether and/or how to the computing device may receive content that may be relevant to the user. In addition, certain data may be treated in one or more ways before it is stored or used by the computing device, so that personally identifiable information is removed. For example, a user's geographic location may be generalized where location information is obtained (such as to a city, ZIP code, or state level), so that an exact location of a user cannot be determined. Thus, the user may have control over how information is collected about the user and used by information server system 60.

Various different computing devices (e.g., computing device 10 of FIG. 1) may send the location, speed, and time information to information server system 60. The computing devices may be configured to periodically send the information (e.g., at a specified time interval, such as every 5 seconds, 1 minute, 5 minutes, 1 hour, etc.), to send the information when the computing device is in or near a predetermined geographic region (e.g., along a roadway, in a metropolitan area, etc.) or outside a predetermined geographic region (e.g., the user has left home), to send the information during a specified time interval (e.g., during rush hour, between noon and 3 PM, etc.), and/or to send the information in response to the computing device determining that the user is driving, taking public transportation, etc.

Location collection module 66 may collect the information from the various computing devices and store the information in device information 64C. Device information 64C represents any suitable storage medium for storing data related to devices, location, time, speed, and other contextual information. For example, device information 64C may store information about a time, location, and speed of one or more computing devices. Location collection module 66 may be configured to store all or some portion of the received information within device information 64C. In examples where location collection module 66 is configured to store a portion of the received information, location collection module 66 may exclude information relating to known common stopping areas. For example, after collecting a sufficient amount of information, stopping area filter module 68 may determine that a particular location is a common stopping area, such as a parking lot or rest area. Location collection module 66 may, based on the determination that the location is a common stopping area, determine that the received information does not need to be stored in device information 64C.

In general, stopping area filter module 68 may filter or otherwise exclude received time, location, and speed information from being stored in device information 64C (e.g., by location collection module 66) and/or from being analyzed when information server system 60 determines whether a particular location is a common or uncommon stopping area. For example, if greater than a threshold number of computing devices within a geographic area (e.g., fifty percent of measured devices within a portion of a freeway) have a current speed that is below a threshold value, stopping area filter module 68 may determine that there is a traffic jam along the particular portion of freeway and cause information server system 60 to refrain from providing assistance information to the computing devices. In some instances, information server 60 may be configured to send a message to the computing devices indicating that assistance information does not need to be output by the computing device (e.g., displayed to a user of the computing device) because the triggering event (e.g., the current speed dropping below a threshold speed) is not indicative of the user needing assistance.

Stopping area filter module 68 may also analyze time, location, and speed information for a particular computing device over a period of time and filter the time, location, and speed information received from the particular computing device based on the analysis. For example, if a user drives a parcel delivery vehicle during the day, stopping area filter module 68 may determine that the frequent starting and stopping indicated by the received information is not indicative of a need for assistance information and, rather, that the particular computing device is associated with a delivery vehicle during the time period. Further, stopping area filter module 68 may exclude the received information from being analyzed for consideration when determining whether a particular location is a common stopping area. That is, even though one or more computing devices may frequently stop in a particular location, the particular location may not be a common stopping area. Instead, information server system 60 may determine that, if a different computing device (e.g., not one associated with a delivery vehicle, during a different time period, etc.) is stopped at a location at which the computing device associated with the delivery vehicle frequently stops, the stopping area is an uncommon stopping area.

Similarly, information server system 60 may determine that other locations associated with frequent stops may be determined to be a common stopping area during certain time periods and an uncommon stopping area during other time periods. For example, if parking along a street is permitted during certain times of day, information server system 60 may determine that a computing device that stopped at that location during the time of day in which parking is permitted is not associated with a user in need of assistance information. Whereas, if the same computing device is stopped at the same location during a time of day in which parking is not permitted, information server system 60 may determine that a user associated with the computing device is in need of assistance information and may provide at least an indication of assistance information to the computing device. In this manner, information server system 60 may dynamically determine which locations are uncommon stopping areas based not only on the particular location, but also on a time of day and other locations at which the computing device previously stopped.

Figure 3:
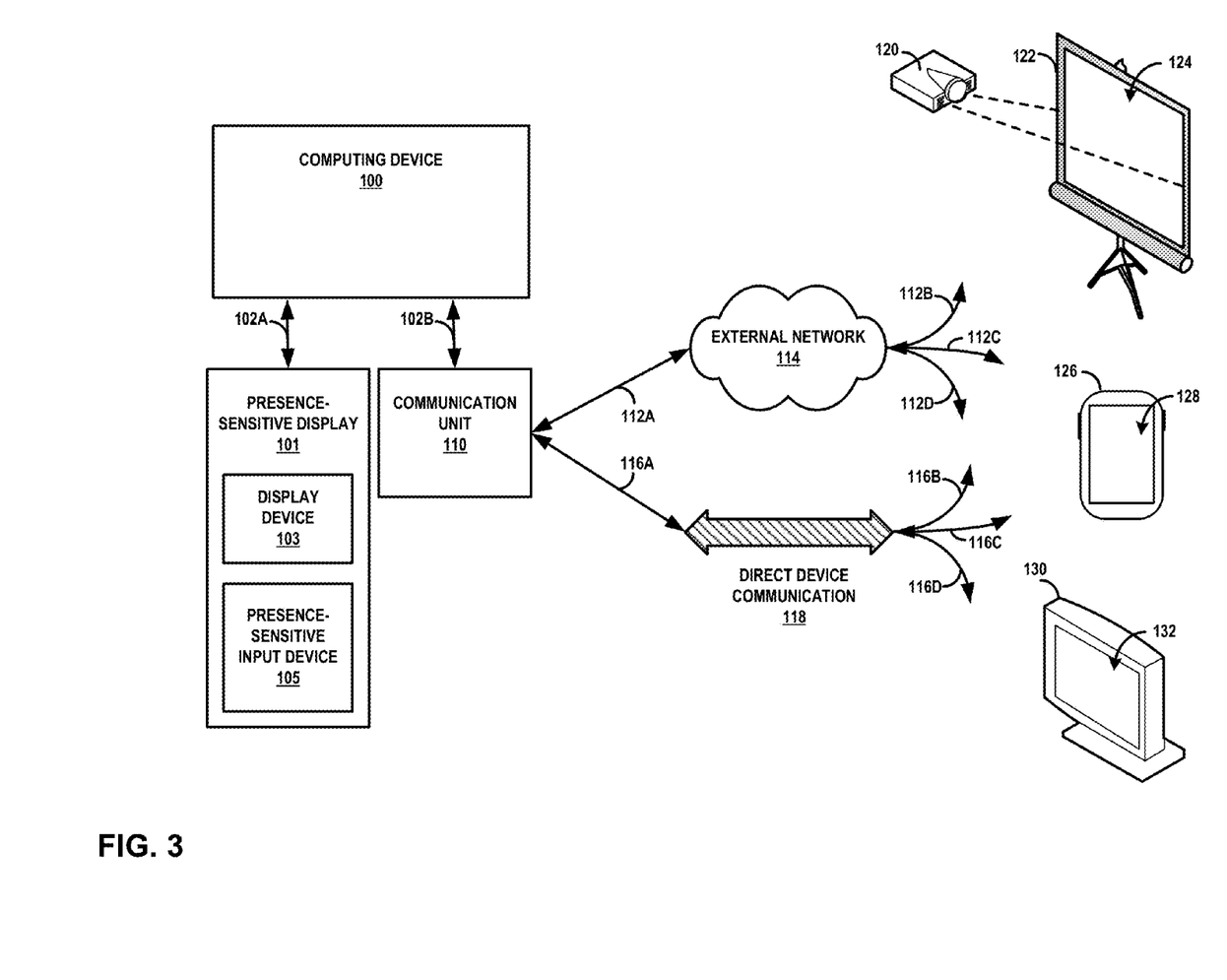
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIG. 1 as a stand-alone computing device 10, a computing device such as computing devices 10, 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 70 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 10 in FIG. 1, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, heads up display (HUD) and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, automobile displays, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Responsive to receiving assistance information (e.g., from information server 60 of FIGS. 1 and 2), computing device 100 may automatically output assistance information to visual display device 130. In one example, visual display device 130 may be an automatable display (e.g., a navigation system or other information display in a dashboard of an automobile). If computing device 100 determines that assistance-type information is relevant to a user of computing device 100 (e.g., because a speed of computing device 100 is below a threshold speed and because computing device 100 is at a location determined to be an uncommon stopping area), computing device 100 may output, for display, assistance information via direct device communication 118 or external network 114 to display device 130. In some examples, display device 130 outputs the information for display to a user. The user may, in turn, select or dismiss some or all of the displayed assistance information. Computing device 100 and display device 130 may be configured such that selection of a particular element of the assistance information (e.g., a displayed telephone number), may cause computing device 100 to call the assistance service provider associated with the selected assistance information.

Figure 4:
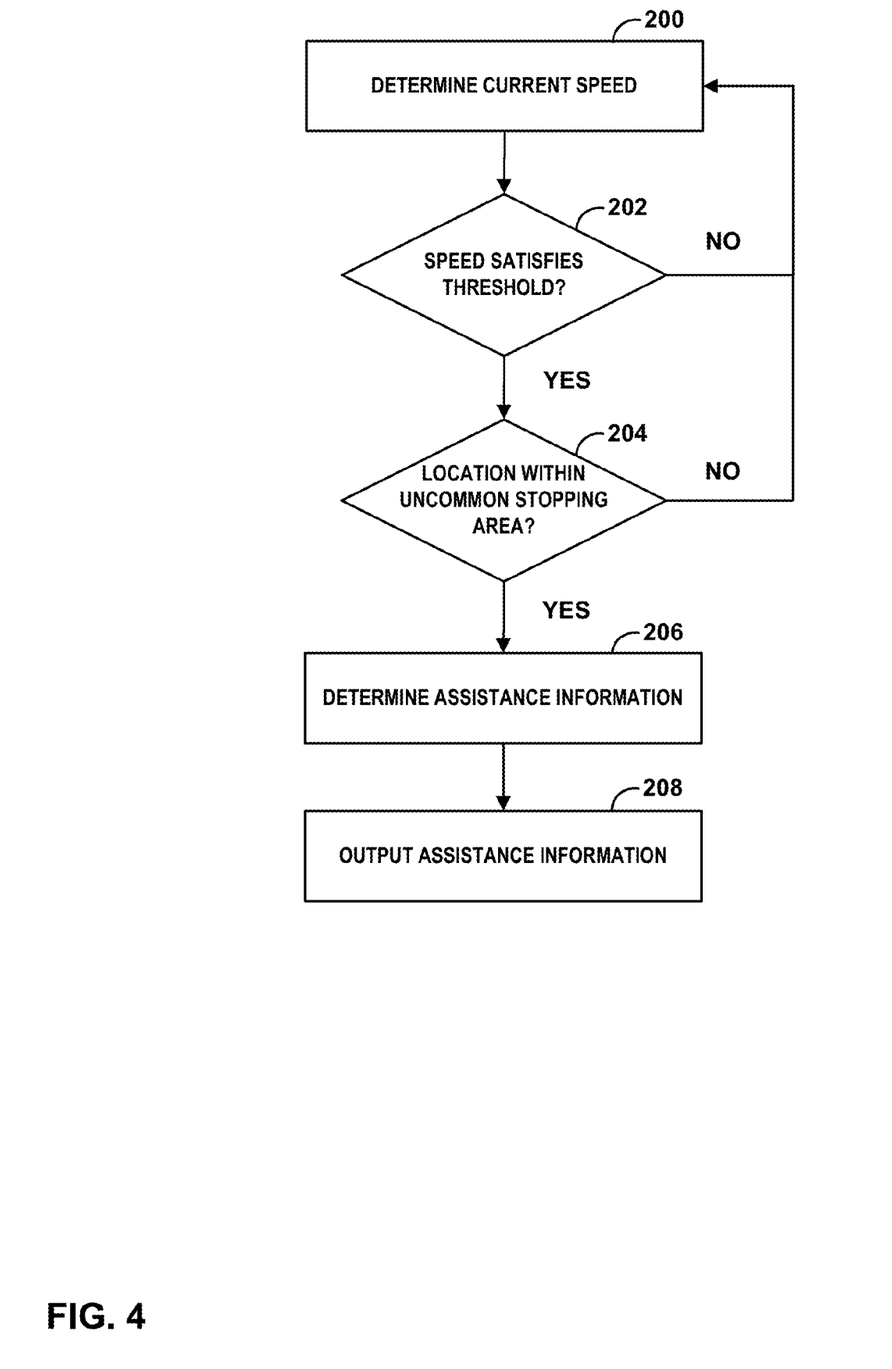
FIG. 4 is a flowchart illustrating example operations of an example computing device configured to predictively present assistance information, in accordance with one or more aspects of the present disclosure.

FIG. 4 is a flowchart illustrating example operations of an example computing device configured to predictively present assistance information, in accordance with one or more aspects of the present disclosure. The process of FIG. 4 may be performed by one or more processors of a computing device, such as computing device 10 and computing device 100 illustrated in FIG. 1 and FIG. 3. For purposes of illustration, FIG. 4 is described below within the context of computing device 10 of FIG. 1.

Device location module 22 of computing device 10 may determine a current speed of computing device 10 (200) and determine whether the current speed satisfies a threshold speed (202). In the example operations illustrated in FIG. 4, the current speed satisfies the threshold speed when the current speed is less than the threshold speed and does not satisfy the threshold speed when the current speed is greater than or equal to the threshold speed. In other examples, the current speed may satisfy the threshold speed when the current speed is greater than the threshold speed, or greater than or equal to the threshold speed or less than or equal to the threshold speed, any of which may be used with the techniques of this disclosure. In some examples, device location module 10 may determine that the current speed of the computing device satisfies the threshold speed when different updated current speeds each satisfy the threshold speed during a threshold amount of time.

If the current speed does not satisfy the threshold speed ("NO" branch of 202), device location module 22 may be configured to periodically determine the current speed of computing device 10 (200). If the current speed does satisfy the threshold speed ("YES" branch of 202), device location module 22 may provide location current time and location information to prediction module 24. Prediction module 24 may determine whether a current location of computing device 10 is associated with an uncommon stopping area (204).

In determining whether the current location of computing device 10 is associated with an uncommon stopping area (204), prediction module 24 may analyze stopping area information stored at computing device 10 and/or may send a request to a remote server (e.g., information server system 60). In some examples, prediction module 24 may determine if the current location of computing device 10 is associated with an uncommon stopping area by at least determining whether the current geographic location of the computing device is included within the uncommon stopping area for a threshold amount of time (e.g., 2 minutes, 5 minutes, 15 minutes, etc.). As another example, prediction module 24 may, responsive to determining that the current location is not associated with an uncommon stopping area, perform additional analysis. For example, prediction module 24 may determine a current time, obtain temporal limitations associated with the current geographic location and the current time, and, responsive to determining that computing device 10 is not permitted to stop at the geographic location at the current time, determine that assistance-type information is relevant to the user.

In instances where computing device 10 sends a request to information server system 60, the request may include the current location of computing device 10, the current speed of computing device 10 and/or a current time. Information server system 60 may analyze the received information and send a response to the request, the response indicating whether the current location of computing device 10 is associated with an uncommon stopping area. In instances where the current location is not associated with an uncommon stopping area (i.e., the current location is associated with a common stopping area) ("NO" branch of 204), computing device 10 may refrain from identifying and outputting assistance information and, instead, may periodically determine the current speed of computing device 10 (200).

In instances where computing device 10 determines that the current location of computing device 10 is associated with an uncommon stopping area ("YES" branch of 204), computing device 10 may determine whether assistance-type information is relevant to a user of computing device 10 and identify assistance information to output for display (206). In some examples, prediction module 24 may determine that assistance-type information is relevant to a user of computing device 10 in response to determining that the current speed of the computing device satisfies the threshold speed for a threshold amount of time and that the current geographic location of the computing device is included within the uncommon stopping area for the threshold amount of time. As another example, prediction module 24 may determine that assistance-type information is relevant to the user of computing device 10 in response to determining that a deceleration rate of computing device 10 exceeds a maximum threshold deceleration rate (e.g., when the deceleration rate is associated with a vehicle being in an accident). The deceleration rate may be determined by prediction module 24 based at least in part on accelerometer information received from an accelerometer of computing device 10.

Assistance module 26 may identify the assistance information based on the current geographic location of computing device 10. For example, assistance module 26 may identify one or more service providers within a threshold distance of the current location of computing device 10. Assistance module 26 may further identify which service providers are currently open for business (e.g., providing assistance services at the current time). The assistance information may be retrieved from a local or remote data store accessible by computing device 10 or may be received from information server system 60 (e.g., in response to computing device 10 sending information server system 60 a request for assistance information). Responsive to identifying the assistance information, computing device 10 outputs the assistance information (208). In some examples, computing device 10 may be configured to cease output of the assistance information in response to determining that an updated current speed of computing device 10 no longer satisfies the threshold speed.

Figure 5:
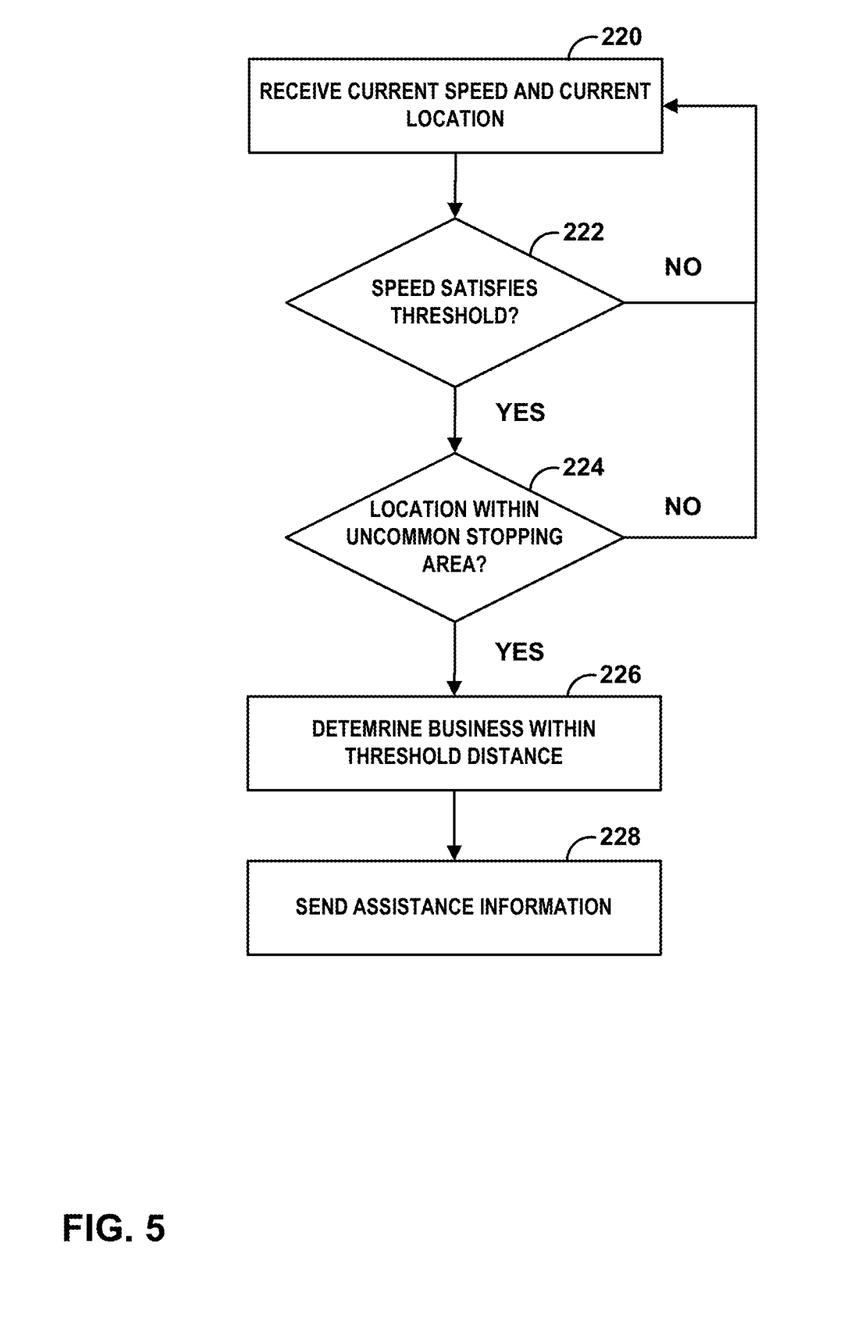
FIG. 5 is a flowchart illustrating example operations of an example computing system configured to determine assistance information, in accordance with one or more aspects of the present disclosure.

FIG. 5 is a flowchart illustrating example operations of an example computing system configured to determine assistance information, in accordance with one or more aspects of the present disclosure. The process of FIG. 5 may be performed by one or more processors of a computing system, such as information server system 60 illustrated in FIGS. 1 and 2. For purposes of illustration, FIG. 5 is described below within the context of information server system 60 of FIGS. 1 and 2.

Information server system 60 may receive current speed and current location information from a computing device (e.g., computing device 10 of FIG. 1) (220) and may determine whether the current speed of the computing device satisfies a threshold speed (222). In the example operations illustrated in FIG. 5, the current speed satisfies the threshold speed when the current speed is less than the threshold speed and does not satisfy the threshold speed when the current speed is greater than or equal to the threshold speed. In other examples, the current speed may satisfy the threshold speed when the current speed is greater than the threshold speed, or greater than or equal to the threshold speed or less than or equal to the threshold speed, any of which may be used with the techniques of this disclosure. If the current speed does not satisfy the threshold speed ("NO" branch of 222), information server system 60 may be configured to wait to receive another current speed of a computing device (220). If the current speed does satisfy the threshold speed ("YES" branch of 222), information server system 60 may determine whether a current location of computing device 10 is associated with an uncommon stopping area (224).

In determining whether the current location of computing device 10 is associated with an uncommon stopping area (224), information server system 60 may analyze stopping area information stored in device information 64C and location information 64B. Information server system 60 may analyze the received information and send a response indicating whether the current location of computing device 10 is associated with an uncommon stopping area. In instances where the current location is not associated with an uncommon stopping area (i.e., the current location is associated with a common stopping area) ("NO" branch of 224), may be configured to wait to receive another current speed of a computing device (220).

In instances where information server system 60 determines that the current location of computing device 10 is associated with an uncommon stopping area ("YES" branch of 224), information server system 60 may identify businesses located within a threshold distance of the current location of computing device 10 (226). For example, information retrieval module 62 may retrieve information about business from assistance information 64A. Information retrieval module 62 may identify one or more service providers within a threshold distance of the current location of computing device 10. Information retrieval module 62 may further identify which service providers are currently open for business (e.g., providing assistance services at the current time). In general, information retrieval module 62 retrieves business information, including a location of the business and operating hours of the business, from assistance information 64A. In some examples, information retrieval module 62 may also retrieve navigation information from location information 64B. The navigation information may include directions from the current location of computing device 10 to a respective location of each business included in the assistance information. Information server system 60 may send at least an indication of the retrieved assistance information (e.g., the business information and/or the navigation information) to computing device 10 (228)

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a computing device, a current speed of the computing device; responsive to determining that the current speed of the computing device satisfies a threshold speed, determining whether the computing device is currently located within an uncommon stopping area, the uncommon stopping area being a geographic area in which fewer than a threshold number of other computing devices have been determined to have previously stopped;
   responsive to determining that the computing device is currently located within the uncommon stopping area:
   determining whether assistance-type information is relevant to a user of the computing device; and responsive to determining that the assistance-type information is relevant to the user:
   determining, based on a current geographic location of the computing device, assistance information relevant to the current geographic location; and outputting, by the computing device and for display, the assistance information; and
   responsive to determining that the computing device is not currently located within the uncommon stopping area:
   determining, by the computing device, a current time;
   obtaining, by the computing device, temporal limitations associated with the current geographic location and the current time;
   determining, based on the temporal limitations, whether the computing device is permitted to stop at the current geographic location at the current time; and
   responsive to determining that the computing device is not permitted to stop at the current geographic location at the current time, determining, by the computing device, that assistance-type information is relevant to the user of the computing device.

2. The method of claim 1, wherein determining whether assistance-type information is relevant to a user of the computing device comprises:
   responsive to determining that a speed of the computing device has satisfied the threshold speed for a threshold amount of time and that the computing device has been located within the uncommon stopping area for the threshold amount of time, determining, by the computing device, that the assistance-type information is relevant to the user of the computing device.

3. The method of claim 1, wherein determining whether assistance-type information is relevant to a user of the computing device comprises:
   obtaining, by the computing device, an indication of a current average speed of one or more other computing devices located within the uncommon stopping area; and
   responsive to determining that the current average speed of the one or more other computing devices does not satisfy the threshold speed, determining that the assistance-type information is relevant the user of the computing device.

4. The method of claim 1, further comprising:
   determining, by the computing device, an updated current speed of the computing device; and
   responsive to determining that the updated current speed of the computing device does not satisfy the threshold speed, ceasing output of the assistance information.

5. The method of claim 1, wherein determining whether the computing device is currently located within the uncommon stopping area comprises:

sending, by the computing device, an indication of the current geographic location of the computing device to a remote computing system;

receiving, by the computing device, from the remote computing system, an indication of whether the current geographic location of the computing device is within the uncommon stopping area; and determining, by the computing device and based on the received indication, whether the computing device is currently located within the uncommon stopping area.

6. The method of claim 1, wherein determining the assistance information relevant to the current location comprises:

sending, by the computing device, an assistance request to a computing system, the assistance request including the current geographic location;

receiving, by the computing device, from the computing system, the assistance information, wherein the assistance information includes information about one or more businesses that are located within a threshold distance from the current geographic location.

7. The method of claim 6, wherein the one or more businesses included in the assistance information have a business type associated with providing assistance services.

8. The method of claim 1, wherein determining whether assistance-type information is relevant to the user of the computing device comprises:

determining, by the computing device, based on accelerometer information, a deceleration rate of the computing device; and responsive to determining that the deceleration rate of the computing device exceeds a maximum threshold deceleration rate, determining that assistance-type information is relevant to the user of the computing device.

9. A computing device comprising: one or more processors;

a memory configured to store at least one module, wherein the at least one module is executable by the one or more processors to:

determine a current speed of the computing device; responsive to determining that the current speed of the computing device satisfies a threshold speed:

send an indication of a current geographic location of the computing device to a remote computing system;

receive, from the remote computing system, an indication of whether the current geographic location of the computing device is within an uncommon stopping area, the uncommon stopping area being a geographic area in which fewer than a threshold number of other computing devices have been determined to have previously stopped; and determine, based on the received indication, whether the current geographic location of the computing device is within the uncommon stopping area;

responsive to determining that the current geographic location of the computing device is within the uncommon stopping area, determine whether assistance-type information is relevant to a user of the computing device;

responsive to determining that assistance-type information is relevant to the user of the computing device:

determine, based on the current geographic location, assistance information relevant to the current geographic location; and output, for display, the assistance information; and responsive to determining that the current geographic location of the computing device is not within the uncommon stopping area:

determine a current time;

obtain temporal limitations associated with the current geographic location and the current time; and responsive to determining that the computing device is not permitted to stop at the current geographic location at the current time, determine that the assistance-type information is relevant to the user of the computing device.

10. The computing device of claim 9, wherein the at least one module is further executable by the one or more processors to:

responsive to determining that a speed of the computing device has satisfied the threshold speed for a threshold amount of time and that the computing device has been located within the uncommon stopping area for the threshold amount of time, determine that the assistance-type information is relevant to the user of the computing device.

11. The computing device of claim 9, wherein the at least one module is further executable by the one or more processors to:

obtain an indication of a current average speed of one or more other computing devices located within the uncommon stopping area; and responsive to determining that the current average speed of the one or more other computing devices does not satisfy the threshold speed, determine that the assistance-type information is relevant to the user of the computing device.

12. The computing device of claim 9, wherein the at least one module is further executable by the one or more processors to:

determine an updated current speed of the computing device; and responsive to determining that the updated current speed of the computing device does not satisfy the threshold speed, cease output of the assistance information.

13. The computing device of claim 9, wherein the at least one module is further executable by the one or more processors to:

send an assistance request to the remote computing system, the assistance request including the current geographic location; and receive, from the remote computing system, the assistance information, wherein the assistance information includes information about one or more businesses that are located within a threshold distance from the current geographic location.

14. The computing device of claim 9, wherein the at least one module is further executable by the one or more processors to:

determine, based on accelerometer information, a deceleration rate; and responsive to determining that the deceleration rate exceeds a maximum threshold deceleration rate, determine that the assistance-type information is relevant to the user of the computing device.

15. A method comprising:

receiving, by a computing system, from a mobile computing device, an indication of a current speed of the mobile computing device and a current geographic location of the mobile computing device;

responsive to determining that the current speed of the mobile computing device satisfies a threshold speed:

determining, by the computing system, whether the current geographic location of the mobile computing device is within an uncommon stopping area!

responsive to determining that the current geographic location is within the uncommon stopping area:
  determining, by the computing system, one or more businesses located within a threshold distance from the current geographic location of the mobile computing device, the one or more businesses being categorized as providing assistance services;
  retrieving, by the computing system, information about the one or more determined businesses as assistance information; and
  sending, by the computing system, to the mobile computing device, the assistance information and
responsive to determining that the mobile computing device is not currently located within the uncommon stopping area:
  determining, by the computing system, temporal limitations associated with the current geographic location of the mobile computing device and a current time;
  determining, based on the temporal limitations, whether the mobile computing device is permitted to stop at the current geographic location at the current time; and
  responsive to determining that the computing device is not permitted to stop at the current geographic location at the current time, sending, by the computing system, to the mobile computing device, the assistance-type information.

16. The method of claim 15, further comprising:
receiving, by the computing system, respective current speed information for one or more other computing devices located within a threshold distance from the geographic location of the mobile computing device;
determining, by the computing system, a current average speed of the one or more other computing devices; and
responsive to determining that the current average speed of the one or more other computing devices does not satisfy the threshold speed, sending, by the computing system, to the mobile computing device, the assistance information.

17. The method of claim 15, further comprising:
receiving, by the computing system, respective location information and respective time information for a plurality of computing devices, the location information corresponding to a stopping area; and
determining, by the computing system and based on the respective time information, that the stopping area corresponds to a common stopping area during a first time period and the uncommon stopping area during a second time period.

18. The method of claim 15, further comprising:
receiving, by the computing system, respective location information for a plurality of computing devices, the location information corresponding to a stopping area; and
determining, by the computing system and based on the respective location information, that the stopping area corresponds to a common stopping area.

* * * * *